March 9, 1937. J. M. PESTARINI 2,073,525
MEANS FOR CONTROLLING THE ELECTRICAL CHARACTERISTICS
OF DIRECT CURRENT GENERATORS AND TRANSFORMERS
Filed Aug. 16, 1934
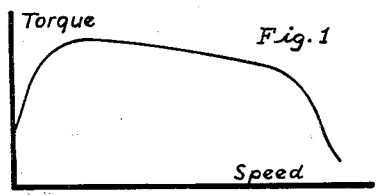
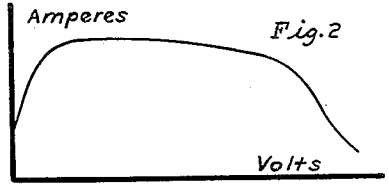
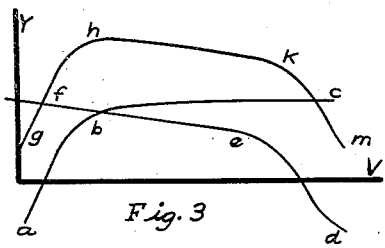
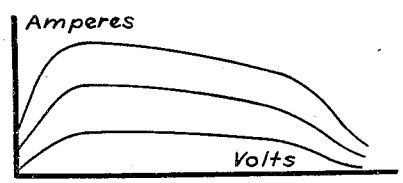
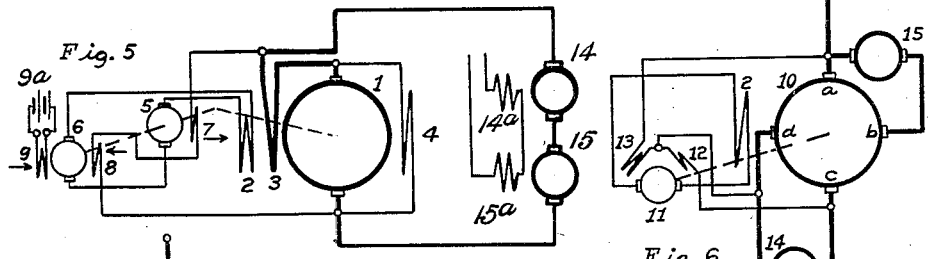
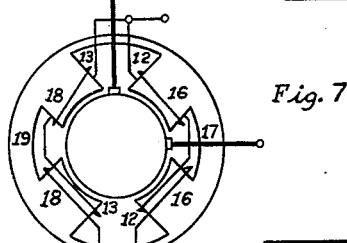
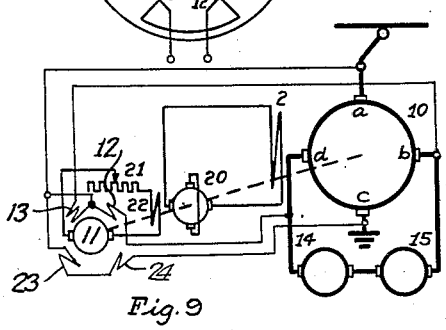
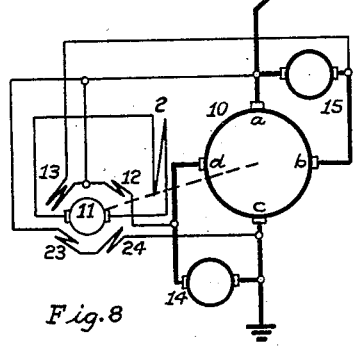
INVENTOR.
José Maximus Pestarini Patented Mar. 9, 1937

2,073,525

UNITED STATES PATENT OFFICE 2,073,525

MEANS FOR CONTROLLING THE ELECTRICAL CHARACTERISTICS OF DIRECT CURRENT GENERATORS AND TRANSFORMERS

Joseph Maximus Pestarini, Grant City, N. Y.

Application August 16, 1934, Serial No. 740,132

18 Claims. (Cl. 171—123)

This invention relates to means for the control of the voltage-current characteristic of special direct current generators and transformers, particularly suitable for electric traction purposes. In a locomotive, or in a motor coach, the torque-speed characteristic must be such as to allow for a maximum schedule speed with the greatest safety and the least discomfort for passengers. While accelerating, the most desirable torque-speed characteristic begins with a rather small torque at the starting point in order to avoid a sudden shock to the passengers and then the torque must quickly increase to the maximum allowed by the coefficient of adhesion and it must afterwards be maintained as high as possible; nevertheless the coefficient of adhesion decreases when the speed increases and therefore the torque must also decrease slightly when the speed increases; when a given high speed is reached the torque must decrease very quickly in order to prevent exceeding the maximum safe speed. While braking the most desirable torque-speed characteristic begins at high speed with a moderate torque in order to avoid a sudden shock to the passengers at the beginning of the braking, and then the torque must increase smoothly up to the highest value allowed by the coefficient of adhesion for a safe running without slipping the wheels. Then, when the speed diminishes, the braking torque must increase slightly because the coefficient of adhesion increases, and finally at very low speed, when approaching the stopping point, the torque must decrease quickly in order to avoid discomfort to the passengers when stopping and to facilitate the choice of the stopping point. Further, it is very desirable to avoid the eventual tendency to motoring after stopping if the drivers do not cut off the current immediately. This danger is completely eliminated if the torque decreases toward very low values when the motors tend to run in the reverse direction after the braking operation.

An object of my invention is to provide a dynamo-electric machine or an electrical system of this character having an inherent torque-speed and voltage-load characteristic most desirable for rapid acceleration consistent with smooth and even operation.

The scope of the present invention is to provide means for obtaining the above described torque-speed characteristic, automatically, without the aid of relays, independently from the driver's will. The driver will simply have to keep steadily the handle of the controller at the same position while accelerating and keep the handle at another position while braking the same throughout the braking operation.

The invention applies to those equipments where the motors are supplied with current by the intermediary of a generator or a transformer. The invention consists essentially in the use of a small special auxiliary generator, called hereinafter "modulator" for the sake of brevity supplying with current the field winding which controls the current of the machine supplying the traction motors; the modulator creates an electromotive force which is the result of two component electromotive forces, the first component being due to a field linked by ampere turns increasing with the speed, and the second component being due to a field linked by ampere turns decreasing when the speed increases, both fields being created in a magnetic circuit the iron of which is saturated along a large zone within the operation range. The resultant electromotive force created by the modulator is slightly varying with the speed for the whole zone of the intermediary values of the speed, and drops quickly for very low or very high speeds, taking thus a shape very similar to the shape of the desired torque-speed characteristic, here above described; as the modulator feeds the field winding of the main generator or of the main transformer, it follows that the current itself which is supplied to the motors, and therefore the torque developed by the motors themselves, will vary with the speed according to the desired characteristic. There is, then, no need to rely upon relays to modify the fields during normal operation when the speed reaches some definite values.

An embodiment is hereinafter described in detail and many improvements of it also are disclosed, reference being made to the accompanying drawing. Fig. 1 is a diagram showing the desired torque-speed characteristic; Fig. 2 is the corresponding current-voltage characteristic; Fig. 3 is a diagram of the component electromotive forces created in the modulator, and of the resultant electromotive force; Fig. 4 shows a family of desired characteristics; Fig. 5 shows the general arrangement, the main machine being a dynamo; Fig. 6 shows the arrangement applied to a metadyne equipment; Fig. 7 gives the principle of the modulator; Fig. 8 and Fig. 9 give alternative arrangements applied to metadyne equipments with additional improvements.

The metadyne here above mentioned has been already the object of many United States patents, for instance, of Patent No. 1,969,699; Patent No. 1,945,447; Patent No. 1,962,030. The metadyne essentially consists of a rotor or armature with winding and commutator as in a dynamo machine; a stator is provided affording a return path of low magnetic reluctance for the fluxes which are set up by the rotor currents; generally the commutator carries two sets of brushes electrically displaced from each other for providing a primary circuit and a secondary circuit through the rotor or armature and the current traversing one set of brushes creates by its rotor ampere-turns a flux which induces an electromotive force between the brushes of the other set. One set of brushes, called primary and traversed by a current called primary current, has its brushes kept at a constant difference of voltage; the other set of brushes, called secondary and traversed by a current called secondary current, is connected to an electrical load or consumers supplied with current by the metadyne.

A description in detail of the metadyne principles is given in a paper entitled "Esquisse sur la Metadyne" by J. M. Pestarini in the "Bulletin Scientifique A. I. M." No. 4, April 1931 of "L'Association des Ingeneurs Electriciens" published by the "Institut Electrotechnique Montefiore," Liege, Belgium.

Referring to Fig. 1, the diagram shows the torque-speed characteristic desired for the accelerating period and the braking period as well. At zero speed the torque is very small and when the speed increases, the torque increases very quickly until it reaches its maximum value, then it decreases slightly with the speed and when a high speed is reached, which is the limit of the safe speed, the torque diminishes very quickly. If again the speed from zero becomes slightly negative the torque diminishes very quickly toward zero rendering impossible any acceleration toward negative speeds.

If the motors are separately excited with constant field ampere turns, the equivalent torque-speed and current-voltage characteristics are very similar to one another, as Figs. 1 and 2 show. The current-voltage characteristic is only slightly distorted even when the motor excitation varies to some extent, being stronger at low speed and weaker at high speed; thus we may start from the current-voltage characteristic shown by Fig. 2. Accordingly, the excitation of the main dynamo-electric machine is made to increase rapidly in intensity at low machine terminal voltages to a predetermined terminal voltage after which the excitation is substantially constant to a second predetermined terminal voltage at which the excitation rapidly decreases in intensity.

Such a characteristic is obtained by the modulator when designed according to this invention. The modulator, in its roughest form, consists of two small auxiliary dynamo-electric machines shown in the scheme of Fig. 5 by the reference characters 5 and 6, connected in series and so designed and excited as to be endowed with special characteristics abc and fed respectively, shown by Fig. 3. In the latter diagram the voltage V of the main machine is taken as abscissae. The resultant electromotive force is given by the ordinates of the line ghkm, and the same curve may also represent the current traversing the field coil 2 of the main machine 1. In order to obtain the component electromotive forces abc and fed, one dynamo electric machine, indicated by 5, is excited with ampere turns, created by the coil or a field exciting winding 7, increasing with the voltage supplied by the main machine, and the other dynamo electric machine, indicated by 6, is excited with ampere-turns decreasing when the voltage supplied by the main machine increases; to obtain this result, two coils or field exciting windings, 9 and 8, are provided; the coil 9, separately excited, which creates a constant excitation by its ampere turns, and the coil 8, connected in series with 7 across the terminals of the main machine, which produces an excitation increasing with the voltage of the main machine and in opposition to the excitation produced by the field exciting winding 9. The desired characteristics are obtained by a suitable design of the magnetic circuit.

The description of Fig. 5 will be completed now by adding that the generator 1 is provided with a shunt field exciting winding 4 and a series field winding 3, in addition to the field winding 2 connected across the modulator 5 and 6. The generator 1 is assumed to rotate at its critical speed as determined by its shunt winding 4; therefore the ampere turns created by 4 will suffice for its excitation for any voltage within the range of operation, and the ampere turns created by 2 and 3 must balance one another. The operation of this system may be more clearly understood if the characteristics of a self-excited generator provided with a source of separate excitation are considered. When no separate excitation is provided to such a machine, it will not "build-up", that is, no voltage will be generated unless the resistance of the shunt connected field circuit is below a given value. Also, there will be a certain definite resistance of the shunt connected field exciting winding at which a given speed will cause the generator to have a magnetization curve characteristic such that it will operate along the straight unsaturated portion thereof. This is the meaning of the term "critical speed" as used in this application. When operating at this speed the generator voltage may be made to assume any desired value within the unsaturated range by providing the required excitation for the desired voltage until this voltage is generated. This may be done by any suitable auxiliary exciting arrangement, such as by some auxiliary separately excited field exciting windings. Once the desired voltage is reached the shunt connected field exciting winding will provide the necessary excitation for maintaining this voltage and the auxiliary excitation must then be compensated or removed. In this manner any desired voltage-current characteristic can be obtained within the unsaturated range when operating at the critical speed of the generator, if the excitation of the generator is provided by some auxiliary field exciting winding so that it is made to assume the value required to induce the desired voltage and this auxiliary excitation is then compensated or removed. Thus by providing the field exciting winding 2 of the generator 1 with excitation having a characteristic as shown by curve g, h, k, m in Fig. 3, and then effectively compensating for the excitation provided by the field exciting winding 2, when the desired generated voltage is reached, the shunt connected field exciting winding 4 will maintain the voltage until the excitation of the field exciting winding 2 again varies. For this reason the series connected field exciting winding 3 is constructed and arranged so that, when the desired current for a particular voltage is reached, the excitation thereof is equal and opposite to that provided by the field exciting winding 2, and the only effective excitation is that of the shunt connected field exciting winding 4, as explained above. In the arrangement shown in Fig. 5, when the machines 1, 5, and 6 are driven at a definite speed, and the field exciting winding 9 is separately excited, as shown, the auxiliary dynamo-electric machine 6 generates a voltage which is impressed upon the field exciting winding 2. This, in turn, causes a voltage to be generated by the machine 1 which is impressed across the shunt connected field exciting winding 4, so that the excitation of the generator 1 is increased by the excitation of the field exciting winding 4, and the voltage thereof again increases. Since the field exciting windings 7 and 8 are connected in series with each other and across the terminals of the generator 1, they will be excited in proportion to the voltage generated by the generator 1, and the excitation of the field exciting winding 2 will follow the characteristic represented by the curve $g, h, k, m$, of Fig. 3, as explained above. If the motors 14 and 15 are connected in series with the field exciting winding 3, as shown, a current will flow therethrough, and the field exciting winding 3 will effectively oppose any tendency for the voltage of the generator 1 to build up higher than the no-load value. If the motors are not held at standstill, and the field exciting windings 14a and 15a of the motors are separately excited, they will generate a motor torque and will operate at a definite speed according to the load thereon. When the motors revolve a counterelectromotive force is induced in the motor armatures proportional to their speed and excitation, and this counterelectromotive force opposes the voltage of the generator 1, and, with the motor resistance drop, determines the current flowing through the motors, and consequently the current flowing through the series field exciting winding 3. Thus, the speed of the motors determines the excitation of the field exciting winding 3 and consequently determines the net excitation of the generator 1, and the voltage thereof will build up to such a value that the excitation of the field exciting winding 2 is exactly equal and opposite to that of the field exciting winding 3. Since the excitation of the field exciting winding 2 will follow the characteristics shown as a curve $g, h, k, m$, in Fig. 3, it is seen that the current through the field exciting winding 3, that is, the current delivered by the generator 1 will also vary as the ordinates of the characteristic $ghkm$ as desired.

Instead of requiring two separate auxiliary dynamo-electric machines, the desired modulator characteristics may be designed into only one auxiliary machine; one versed in the art can conceive many kinds of designs, and one of the preferable ones is schematically shown in Fig. 7.

The rotor or armature is provided with a conventional direct current dynamo-electric machine armature wave winding and the stator excitation is arranged so that some portions of the wave winding cut the flux created in one magnetic circuit and are the seat of the first component electromotive force hereabove mentioned, while the other portions cut the flux created in the other magnetic circuit and they are the seat of the second component electromotive force hereabove mentioned. The rotor winding in Fig. 7 is assumed to be a conventional direct current dynamo-electric machine armature winding having four poles, and two portions of the winding, corresponding to two polar pitches, cut the flux issuing from the magnectic circuit 16, 17, 16, while the other two portions cut the flux issuing from the magnetic circuit 18, 19, 18. This is the usual manner in which a conventional direct current dynamo-electric machine armature winding would cut the stator field shown in this figure, and with the usual arrangement of the brushes, one of the two halves of the armature will have induced therein a voltage having a characteristic curve $a, b, c$, and the other half, a voltage characteristic curve $f, e, d$, as shown in Fig. 3. Then the resultant voltage of the dynamo-electric machine 11 is the sum of the components or a voltage characteristic like the curve $g, h, k, m$, of Fig. 3. This machine may thus be used to excite a variator field exciting winding on the main generator as explained above with respect to Fig. 5.

Another suitable design for the modulator into one machine consists in using any rotor winding and arranging the magnetic circuit so as to allow portions of the rotor or armature winding within one polar pitch to cut the two separate fields inducing the two above mentioned electromotive forces therein. Fig. 6 shows such an arrangement schematically; the modulator 11 has a rotor assumed wound for the usual direct current dynamo-electric machine armature two pole winding, and yet each of the two portions of the winding within one polar pitch cuts the flux issuing from two magnetic circuits, one of them being schematically shown as excited by the coil 12 and the other being schematically shown as excited by the coil 13. The resultant brush voltage of the auxiliary dynamo-electric machine 11 is the sum of the component voltages, and is the excitation voltage of the variator field exciting winding 2 on the main generator, as explained above.

Fig. 6 shows a metadyne dynamo-electric machine 10 as main machine; the primary brushes $a$ and $c$ of the metadyne are connected respectively, to the line and to the ground, and the secondary brushes $b$ and $d$ are connected, respectively, to the motors 15 and 14, in the well known "eight connection". The operation of this type of metadyne system is described in my U. S. Patent No. 1,969,699. The modulator 11 supplies the "Secondary variator winding" 2 which is a stator field exciting winding of the metadyne arranged to produce a component of excitation along the secondary commutating axis for inducing an electromotive force between the primary brushes $a$ and $c$. The voltage impressed upon the primary brushes $a$ and $c$ being kept constant, the secondary flux in the direction of the commutating axis of the secondary brushes $b$ and $d$ must also be kept constant, the speed being assumed to be constant. Therefore the ampere turns in the said direction must be constant and any modification of the current in the secondary variator winding 2, is followed by a similar modification of the secondary current delivered by the secondary brushes $b$ and $d$. Thus, as a result, the current-voltage characteristic of the output of the metadyne to the motors will be as desired.

When a metadyne is used as main machine, as Fig. 6 shows, it is very easy to obtain a voltage increasing with the voltage supplied to the motors and another decreasing simultaneously. Thus the voltage between the brushes $b$ and $a$ or between $c$ and $d$ and the voltage between the brushes $c$ and $b$ or between $d$ and $a$ increases and decreases respectively, when the voltage supplied to the motors increases. This is the reason why the coils 12 and 13 are connected to the brushes of the metadyne as shown in the figure, and the coils 12 and 13 will give ampere-turns, respectively, increasing and decreasing when the voltage supplied to the motors increases, that is, the excitation produced by the field exciting winding 12 varies in accordance with the voltage across the electrical motor load 14 and the excitation produced by the field exciting winding 13 varies inversely as the voltage across the electrical load, as required for the two component fields of the modulator 11. As illustrated in Figs. 6, 8 and 9, in order to obtain a definite relation between the excitation of the field exciting winding 2 and the electrical characteristics of the metadyne dynamo-electric machine 10, the auxiliary dynamo-electric machine 11 is driven at a predetermined speed relation to the speed of the metadyne by a mechanical coupling. The arrangement shown in Fig. 8 is similar to that in Fig. 6 except for the alteration of the order of the brushes across which the field coils 12 and 13 are connected. Further, the field coils 23 and 24 are shown and they are assumed to link each of the two component fields, for an appropriate adjustment of the shape of the characteristic to provide a certain amount of separate excitation to the auxiliary dynamo-electric machine 11.

In Fig. 7 only the coils 12, 12 and 13, 13 have been indicated, for the sake of simplicity of the drawing. Further one pair of the terminals of the field coils have been connected together ready for an eventual connection to the brushes of the metadyne.

Fig. 9 illustrates an important improvement, relating to the present invention and in connection with the invention object of my copending application Serial No. 735,003, filed July 13, 1934, "Improvement in the control of the excitation of electrical machines". The main machine is a metadyne 10, the secondary regulator winding of which, 2, is not supplied directly by the auxiliary modulator dynamo-electric machine 11, but by the "conformer metadyne" 20 the secondary current of which is determined by the modulator 11, feeding the secondary variator winding 22 of the auxiliary conformer metadyne dynamo-electric machine.

In traction, a family of similar characteristics is required, as Fig. 4 shows, and not only a single characteristic. This is accomplished according to this invention, by an adjustment of a resistor 21 inserted in the circuit of the modulator. By this means the current supplied by the main machine is reduced without interfering with the field excitation of the modulator, which cannot be easily modified because of the iron saturation.

Various modifications of the arrangements above described will occur to those skilled in the art. I desire it to be understood, therefore, that my invention is not to be limited to the particular arrangements set forth and I intend, in the appended claims, to cover all modifications which do not depart from the spirit and scope of my invention.

Having now particularly described and ascertained the nature of my said invention, and in what manner the same is to be performed, I declare that what I claim is:

1. In combination a dynamo-electric machine including a rotor, a field exciting winding for said dynamo-electric machine, and dynamo-electric means having an excitation responsive to voltage variations of said dynamo-electric machine and energizing said field exciting winding for providing an excitation of inherently rapidly changing intensity at low machine terminal voltages until a predetermined terminal voltage and for providing a substantially constant excitation until a second predetermined machine terminal voltage to said dynamo electric machine, said last mentioned means inherently providing an excitation rapidly changing in intensity above said second predetermined machine terminal voltage.

2. In combination a main dynamo-electric machine including a rotor, a field exciting winding for said dynamo-electric machine, an auxiliary dynamo-electric machine, a field exciting winding for said auxiliary dynamo-electric machine, and means connecting said auxiliary dynamo-electric machine across said main machine field exciting winding and utilizing said auxiliary dynamo-electric machine for providing an excitation of inherently rapidly changing intensity at low main machine terminal voltages until a predetermined terminal voltage and for providing a substantially constant excitation until a second predetermined main machine terminal voltage to said main dynamo-electric machine, said last mentioned means inherently providing an excitation rapidly changing in intensity above said second predetermined main machine terminal voltage.

3. In combination a dynamo-electric machine including a rotor, a field exciting winding for said dynamo-electric machine, dynamo-electric means for energizing said dynamo-electric machine field exciting winding, and means including separate field exciting windings for said dynamo-electric means for producing a resultant rapidly rising voltage characteristic of said dynamo-electric means with rise in voltage of said dynamo-electric machine at low machine terminal voltages until a predetermined machine terminal voltage and for producing a substantially constant voltage between said predetermined machine terminal voltage and a second predetermined machine terminal voltage, said last means producing a rapidly drooping voltage characteristic for said dynamo-electric means above said second predetermined machine terminal voltage.

4. In combination a dynamo-electric machine including a rotor, a field exciting winding for said dynamo-electric machine, dynamo-electric means for energizing said dynamo-electric machine field exciting winding, means including separate field exciting windings for said dynamo-electric means and dependent upon an electrical characteristic of said dynamo-electric machine for producing a resultant rapidly rising voltage characteristic of said dynamo-electric means with rise in voltage of said dynamo-electric machine at low machine terminal voltage until a predetermined machine terminal voltage and for producing a substantially constant voltage between said predetermined machine terminal voltage and a second predetermined machine terminal voltage, said last means producing a rapidly drooping voltage characteristic for said dynamo-electric means above said second predetermined machine terminal voltage.

5. An electrical system including a main dynamo-electric machine having a rotor, a field exciting winding for said main dynamo-electric machine, an auxiliary dynamo-electric machine, means for connecting said auxiliary dynamo-electric machine across said field exciting winding of said main dynamo-electric machine, means including a field exciting winding arranged to provide excitation for said auxiliary dynamo-electric machine of rapidly changing intensity at low main dynamo-electric machine terminal voltages until a predetermined main machine terminal voltage and for providing a substantially constant excitation above said predetermined main machine terminal voltage, and means including a second field exciting winding arranged to produce a substantially constant excitation for said auxiliary dynamo-electric machine until a second predetermined main dynamo-electric machine terminal voltage and for providing an excitation rapidly changing in intensity above said second predetermined main machine terminal voltage.

6. An electrical system including a dynamo-electric machine having a rotor, a field exciting winding for said dynamo-electric machine, means dependent upon the voltage of said dynamo-electric machine for energizing said field exciting winding, a second field exciting winding for said dynamo-electric machine, means dependent upon an electrical characteristic of said dynamo-electric machine for energizing said second field exciting winding, a third field exciting winding for said dynamo-electric machine arranged to oppose said second field exciting winding, and means energizing said third field exciting winding for providing an excitation thereto of rapidly changing intensity at low machine terminal voltages until a predetermined terminal voltage and for providing a substantially constant excitation until a second predetermined machine terminal voltage, said last mentioned means providing an excitation rapidly changing in intensity above said second predetermined main machine terminal voltage.

7. An electrical system including a main dynamo-electric machine having a rotor, a field exciting winding for said main dynamo-electric machine, means dependent upon the voltage across said main dynamo-electric machine for energizing said field exciting winding, a second field exciting winding for said main dynamo-electric machine, means dependent upon the load on said main dynamo-electric machine for energizing said second field exciting winding, a third field exciting winding for said main dynamo-electric machine arranged to oppose said second field exciting winding, an auxiliary dynamo-electric machine, a field exciting winding for said auxiliary dynamo-electric machine, means energizing said auxiliary dynamo-electric machine field exciting winding for providing a substantially constant component of excitation to said auxiliary dynamo-electric machine, a second field exciting winding for said auxiliary dynamo-electric machine arranged to oppose said first mentioned auxiliary dynamo-electric machine field exciting winding, a second auxiliary dynamo-electric machine, a field exciting winding for said second auxiliary dynamo-electric machine, means for connecting in series and for energizing in accordance with the voltage across said main dynamo-electric machine said first mentioned auxiliary dynamo-electric machine second field exciting winding and said second auxiliary dynamo-electric machine field exciting winding, and means connecting said auxiliary dynamo-electric machines in series and across said main dynamo-electric machine third field exciting winding for providing an excitation to said main dynamo-electric machine of rapidly changing intensity at low main machine terminal voltages until a predetermined terminal voltage and for providing a substantially constant excitation until a second predetermined main machine terminal voltage, said last mentioned means providing an excitation rapidly changing in intensity above said second predetermined main machine terminal voltage.

8. A metadyne dynamo-electric machine having an armature and a commutator associated therewith, means including a primary brush set and a secondary brush set associated with said commutator for providing a primary circuit and a secondary circuit through said armature, said secondary brush set being electrically displaced from said primary brush set, means including a field exciting winding for producing a component of excitation along the secondary commutating axis of said metadyne dynamo-electric machine, an electrical load connected across a brush of said primary brush set and a brush of said secondary brush set, an auxiliary dynamo-electric machine, means for driving said auxiliary dynamo-electric machine in a predetermined speed relation to the speed of said metadyne dynamo-electric machine, means including a second field exciting winding for providing a component of excitation to said auxiliary dynamo-electric machine and varying in accordance with the voltage across said electrical load, means including a third field exciting winding for providing a component of excitation to said auxiliary dynamo-electric machine and varying inversely as the voltage across said electrical load, and means for connecting said auxiliary dynamo-electric machine across said metadyne dynamo-electric machine field exciting winding.

9. A metadyne dynamo-electric machine having an armature, means including a primary brush set and a secondary brush set associated with said armature for providing a primary circuit and a secondary circuit through said armature, said secondary brush set being electrically displaced from said primary brush set, a field exciting winding for said metadyne dynamo-electric machine, an auxiliary dynamo-electric machine, means for driving said auxiliary dynamo-electric machine in a predetermined speed relation to the speed of said metadyne dynamo-electric machine, means including a second field exciting winding for providing a component of excitation to said auxiliary dynamo-electric machine and varying in accordance with the secondary terminal voltage of said metadyne dynamo-electric machine, means including a third field exciting winding for providing a component of excitation to said auxiliary dynamo-electric machine and varying inversely as the secondary terminal voltage of said metadyne dynamo-electric machine, and means for connecting said auxiliary dynamo-electric machine across said metadyne dynamo-electric machine field exciting winding.

10. An electrical system including a metadyne dynamo-electric machine having an armature, means including a primary brush set and a secondary brush set associated with said armature for providing a primary circuit and a secondary circuit through said armature, said secondary brush set being electrically displaced from said primary brush set, a field exciting winding for said metadyne dynamo-electric machine, an electrical load, means for connecting said electrical load across a brush of said primary brush set at one terminal of said primary circuit and a brush of said secondary brush set at one terminal of said secondary circuit, a second electrical load, means for connecting said second electrical load across a brush of said primary brush set at the other terminal of said primary circuit and a brush of said secondary brush set at the other terminal of said secondary circuit, an auxiliary dynamo-electric machine, means for driving said auxiliary dynamo-electric machine in a predetermined speed relation to the speed of said metadyne dynamo-electric machine, a field exciting winding for said auxiliary dynamo-electric machine, means for connecting said auxiliary dynamo-electric machine field exciting winding across a brush of said primary brush set and a brush of said secondary brush set across which is connected one of said electrical loads, a second field exciting winding for said auxiliary dynamo-electric machine, means for connecting said auxiliary dynamo-electric machine second field exciting winding across a brush of said primary brush set and a brush of said secondary brush set across which no electrical load is connected, and means for connecting said auxiliary dynamo-electric machine across said metadyne dynamo-electric machine field exciting winding.

11. A metadyne dynamo-electric machine having an armature, means including a primary brush set and a secondary brush set associated with said armature for providing a primary circuit and a secondary circuit through said armature, said secondary brush set being electrically displaced from said primary brush set, a field exciting winding for said metadyne dynamo-electric machine, an auxiliary dynamo-electric machine having a rotor and a brush set associated with said rotor for providing a plurality of circuits through said rotor, means for driving said auxiliary dynamo-electric machine in a predetermined speed relation to the speed of said metadyne dynamo-electric machine, means including a second field exciting winding for providing a component of excitation affecting one of said circuits through said rotor of said auxiliary dynamo-electric machine and varying in accordance with the secondary terminal voltage of said metadyne dynamo-electric machine, means including a third field exciting winding for providing a component of excitation affecting another of said circuits through said rotor of said auxiliary dynamo-electric machine and varying inversely as the secondary terminal voltage of said metadyne dynamo-electric machine, and means for connecting said auxiliary dynamo-electric machine across said metadyne dynamo-electric machine field exciting winding.

12. An electrical system including a metadyne transformer having an armature and a commutator associated therewith, means including a primary brush set and a secondary brush set associated with said commutator for providing a primary circuit and a secondary circuit through said armature, said secondary brush set being electrically displaced from said primary brush set, a source of substantially constant potential electrical power supply, means for connecting said source of electrical power supply across said primary brush set, an electrical load, means for connecting said electrical load across a brush of said primary brush set at one terminal of said primary circuit and a brush of said secondary brush set at one terminal of said secondary circuit, a second electrical load, means for connecting said second electrical load across a brush of said primary brush set at the other terminal of said primary circuit and a brush of said secondary brush set at the other terminal of said secondary circuit, an auxiliary dynamo-electric machine, means for driving said dynamo-electric machine in a predetermined speed relation to the speed of said metadyne transformer, a field exciting winding for said dynamo-electric machine, means for connecting said dynamo-electric machine field exciting winding across a brush of said primary brush set and a brush of said secondary brush set across which is connected one of said electrical loads, a second field exciting winding for said dynamo-electric machine, means for connecting said dynamo-electric machine second field exciting winding across a brush of said primary brush set and a brush of said secondary brush set across which no electrical load is connected, and means for connecting said dynamo-electric machine across said metadyne transformer field exciting winding.

13. An electrical system including a metadyne dynamo-electric machine having an armature, means including a primary brush set and a secondary brush set associated with said armature for providing a primary circuit and a secondary circuit through said armature, said secondary brush set being electrically displaced from said primary brush set, a field exciting winding for said metadyne dynamo-electric machine, an electrical load, means for connecting said electrical load across a brush of said primary brush set at one terminal of said primary circuit and a brush of said secondary brush set at one terminal of said secondary circuit, a second electrical load, means for connecting said second electrical load across a brush of said primary brush set at the other terminal of said primary circuit and a brush of said secondary brush set at the other terminal of said secondary circuit, an auxiliary dynamo-electric machine, means for driving said auxiliary dynamo-electric machine in a predetermined speed relation to the speed of said metadyne dynamo-electric machine, a field exciting winding for said auxiliary dynamo-electric machine, means for connecting said auxiliary dynamo-electric machine field exciting winding across a brush of said primary brush set and a brush of said secondary brush set across which is connected one of said electrical loads, a second field exciting winding for said auxiliary dynamo-electric machine, means for connecting said auxiliary dynamo-electric machine second field exciting winding across a brush of said primary brush set and a brush of said secondary brush set across which no electrical load is connected, a third field exciting winding for said auxiliary dynamo-electric machine, means for connecting said auxiliary dynamo-electric machine third field exciting winding across said primary brush set, and means for connecting said auxiliary dynamo-electric machine across said metadyne dynamo-electric machine field exciting winding.

14. A power system including a metadyne transformer having an armature and a commutator associated therewith, means including a primary brush set and a secondary brush set associated with said commutator for providing a primary circuit and a secondary circuit through said armature, said secondary brush set being electrically displaced from said primary brush set, a source of substantially constant potential electrical power supply, means for connecting said source of electrical power supply across said primary brush set, an electrical load, means for connecting said electrical load across a brush of said primary brush set at one terminal of said primary circuit and a brush of said secondary brush set at one terminal of said secondary circuit, a second electrical load, means for connecting said second electrical load across a brush of said primary brush set at the other terminal of said primary circuit and a brush of said secondary brush set at the other terminal of said secondary circuit, an auxiliary dynamo-electric machine, means for driving said dynamo-electric machine in a predetermined speed relation to the speed of said metadyne transformer, a field exciting winding for said dynamo-electric machine, means for connecting said dynamo-electric machine field exciting winding across a brush of said primary brush set and a brush of said secondary brush set across which is connected one of said electrical loads, a second field exciting winding for said dynamo-electric machine, means for connecting said dynamo-electric machine second field exciting winding across a brush of said primary brush set and a brush of said secondary brush set across which no electrical load is connected, a third field exciting winding for said dynamo-electric machine, means for connecting said dynamo-electric machine third field exciting winding across said primary brush set, and means for connecting said dynamo-electric machine across said metadyne transformer field exciting winding.

15. An electrical system including a main dynamo-electric machine, a field exciting winding for said main dynamo-electric machine, an auxiliary dynamo-electric machine having an armature, means including a primary brush set and a secondary brush set associated with said armature for providing a primary circuit and a secondary circuit through said armature, said secondary brush set being electrically displaced from said primary brush set, means for connecting said secondary brush set across said main dynamo-electric machine field exciting winding, a field exciting winding for said auxiliary dynamo-electric machine, means including a second auxiliary dynamo-electric machine for energizing said first mentioned auxiliary dynamo-electric machine field exciting winding, and means including a field exciting winding for said second auxiliary dynamo-electric machine and dependent upon an electrical characteristic of said main dynamo-electric machine for producing a rapidly rising voltage characteristic of said second auxiliary dynamo-electric machine with rise in voltage of said main dynamo-electric machine at low main machine terminal voltages until a predetermined main machine terminal voltage and for producing a substantially constant voltage between said predetermined main machine terminal voltage and a second predetermined main machine terminal voltage, said last mentioned means producing a rapidly drooping voltage characteristic for said second auxiliary dynamo-electric machine above said second predetermined main machine terminal voltage.

16. An electrical system including a main metadyne dynamo-electric machine having an armature, means including a primary brush set and a secondary brush set associated with said armature for providing a primary circuit and a secondary circuit through said armature, said secondary brush set being electrically displaced from said primary brush set, a source of substantially constant potential electrical power supply, means for connecting said source of electrical power supply across said primary brush set, an electrical load, means for connecting said electrical load across said secondary brush set, a field exciting winding for said main metadyne dynamo-electric machine, an auxiliary metadyne dynamo-electric machine having an armature, means including a primary brush set and a secondary brush set associated with said auxiliary metadyne dynamo-electric machine armature for providing a primary circuit and a secondary circuit through said armature thereof, said auxiliary metadyne dynamo-electric machine secondary brush set being electrically displaced from said primary brush set thereof, means for connecting said auxiliary metadyne dynamo-electric machine secondary brush set across said main metadyne dynamo-electric machine field exciting winding, a field exciting winding for said auxiliary metadyne dynamo-electric machine, means including a second auxiliary dynamo-electric machine for energizing said auxiliary metadyne dynamo-electric machine field exciting winding, means including a field exciting winding for said second auxiliary dynamo-electric machine and dependent upon an electrical characteristic of said main metadyne dynamo-electric machine for producing a rapidly rising voltage characteristic of said second auxiliary dynamo-electric machine with rise in voltage of said main dynamo-electric machine at low main machine terminal voltages until a predetermined main machine terminal voltage and for producing a substantially constant voltage between said predetermined main machine terminal voltage and a second predetermined main machine terminal voltage, said last mentioned means producing a rapidly drooping voltage characteristic for said second auxiliary dynamo-electric machine above said second predetermined main machine terminal voltage, and means for driving said auxiliary dynamo-electric machines in a predetermined speed relation to the speed of said main metadyne dynamo-electric machine.

17. An electrical system including a main metadyne dynamo-electric machine having an armature, means including a primary brush set and a secondary brush set associated with said armature for providing a primary circuit and a secondary circuit through said armature, said secondary brush set being electrically displaced from said primary brush set, a source of substantially constant potential electrical power supply, means for connecting said source of electrical power supply across said primary brush set, an electrical load, means for connecting said electrical load across said secondary brush set, a field exciting winding for said main metadyne dynamo-electric machine, an auxiliary metadyne dynamo-electric machine having an armature, means including a primary brush set and a secondary brush set associated with said auxiliary metadyne dynamo-electric machine armature for providing a primary circuit and a secondary circuit through said armature thereof, said auxiliary metadyne dynamo-electric machine secondary brush set being electrically displaced from said primary brush set thereof, means for connecting said auxiliary metadyne dynamo-electric machine secondary brush set across said main metadyne dynamo-electric machine field exciting winding, a field exciting winding for said auxiliary metadyne dynamo-electric machine, means including a second auxiliary dynamo-electric machine for energizing said auxiliary metadyne dynamo-electric machine field exciting winding, a field exciting winding for said second auxiliary dynamo-electric machine, means for connecting said second auxiliary dynamo-electric machine field exciting winding across a brush of said main metadyne dynamo-electric machine primary brush set and a brush of said main metadyne dynamo-electric machine secondary brush set at one terminal of said secondary circuit through said main metadyne dynamo-electric machine, a second field exciting winding for said second auxiliary dynamo-electric machine, means for connecting said second auxiliary dynamo-electric machine second field exciting winding across said brush of said main metadyne dynamo-electric machine primary brush set and a brush of said main metadyne dynamo-electric machine secondary brush set at the other terminal of said main metadyne dynamo-electric machine secondary circuit, and means for driving said auxiliary dynamo-electric machines in a predetermined speed relation to the speed of said main metadyne dynamo-electric machine.

18. An electrical system including a main metadyne dynamo-electric machine having an armature, means including a primary brush set and a secondary brush set associated with said armature for providing a primary circuit and a secondary circuit through said armature, said secondary brush set being electrically displaced from said primary brush set, a source of substantially constant potential electrical power supply, means for connecting said source of electrical power supply across said primary brush set, an electrical load, means for connecting said electrical load across said secondary brush set, a field exciting winding for said main metadyne dynamo-electric machine, an auxiliary metadyne dynamo-electric machine having an armature, means including a primary brush set and a secondary brush set associated with said auxiliary metadyne dynamo-electric machine armature for providing a primary circuit and a secondary circuit through said armature thereof, said auxiliary metadyne dynamo-electric machine secondary brush set being electrically displaced from said primary brush set thereof, means for connecting said auxiliary metadyne dynamo-electric machine secondary brush set across said main metadyne dynamo-electric machine field exciting winding, a field exciting winding for said auxiliary metadyne dynamo-electric machine, means including a second auxiliary dynamo-electric machine for energizing said auxiliary metadyne dynamo-electric machine field exciting winding, a field exciting winding for said second auxiliary dynamo-electric machine, means for connecting said second auxiliary dynamo-electric machine field exciting winding across a brush of said main metadyne dynamo-electric machine primary brush set and a brush of said main metadyne dynamo-electric machine secondary brush set at one terminal of said secondary circuit through said main metadyne dynamo-electric machine, a second field exciting winding for said second auxiliary dynamo-electric machine, means for connecting said second auxiliary dynamo-electric machine second field exciting winding across said brush of said main metadyne dynamo-electric machine primary brush set and a brush of said main metadyne dynamo-electric machine secondary brush set at the other terminal of said main metadyne dynamo-electric machine secondary circuit, a third field exciting winding for said second auxiliary dynamo-electric machine, means for connecting said second auxiliary dynamo-electric machine third field exciting winding across said main metadyne dynamo-electric machine primary brush set, and means for driving said auxiliary dynamo-electric machines in a predetermined speed relation to the speed of said main metadyne dynamo-electric machine.

JOSEPH MAXIMUS PESTARINI.